United States Patent [19]

Yaguchi et al.

[11] Patent Number: 4,494,831
[45] Date of Patent: Jan. 22, 1985

[54] SPECTACLE FRAME

[75] Inventors: Kenichi Yaguchi, Chiba; Masaru Ichikawa; Takuji Kinoshita, both of Yokohama, all of Japan

[73] Assignee: Nippon Kogaku K.K., Tokyo, Japan

[21] Appl. No.: 319,619

[22] Filed: Nov. 9, 1981

[30] Foreign Application Priority Data

Nov. 22, 1980 [JP] Japan .................................. 55-164919

[51] Int. Cl.³ .............................................. G02C 5/00
[52] U.S. Cl. ........................................ 351/41; 351/144
[58] Field of Search ................ 351/41, 111, 124, 144, 351/136; 228/263.11, 263.21

[56] References Cited

U.S. PATENT DOCUMENTS 2,362,893  11/1944  Durst .............................. 228/263.11

FOREIGN PATENT DOCUMENTS 51-34743 of 1976 Japan .

Primary Examiner—Rodney B. Bovernick
Attorney, Agent, or Firm—Shapiro and Shapiro

[57] ABSTRACT

This specification discloses a spectacle frame of titanium or titanium alloy having at least one location a brazed portion of titanium or titanium alloy joined with titanium or titanium alloy, or of titanium or titanium alloy joined with other metal, characterized in that silver-zinc alloy comprising 70-95% by weight of silver and 5-30% by weight of zinc is used as the brazing filler metal material for brazing.

3 Claims, 4 Drawing Figures

SPECTACLE FRAME

BACKGROUND OF THE INVENTION

1. Field of the Invention

This invention relates to an improved spectacle frame made of titanium or titanium alloy.

2. Description of the Prior Art

Spectacle frames made of titanium or titanium alloy are already known. For example, the spectacle frame disclosed in Japanese Laid-open Patent Application No. 34743/1976 is made of titanium or titanium alloy.

Titanium or titanium alloy is light in weight and excellent in corrosion resistance and is therefore suitable as the material forming spectacle frames. However, spectacle frames are complicated in configuration to be cast and the melting point of titanium is as high as about 1700° C. and therefore, it is very difficult to make spectacle frames, particularly, front frames by casting titanium. Accordingly, where a spectacle frame made of titanium or titanium alloy is to be obtained, several parts, for example, rims, a bridge, block joints, end pieces, joints, etc. must first be made separately of titanium or titanium alloy, and then these parts must be brazed together.

The aforementioned Japanese Laid-open Patent Application No. 34743/1976 discloses nothing about the brazing. Generally, however, brazing filler metal material such as silver, silver brazing filler metal, nickel brazing filler metal or commercially available brazing filler metal material for titanium is used for the brazing between titanium or titanium alloy and titanium or titanium alloy and between titanium or titanium alloy and other metal.

Extraneous forces such as bending or torsion act on the brazed portion of a spectacle frame each time spectacles are put on or off and therefore, the brazed portion must have a sufficient strength to withstand these extraneous forces. When the silver brazing filler metal prescribed in Japanese Industrial Standard (JIS) Z3261 (which corresponds to AWS 5.8-69) or the nickel brazing filler metal prescribed in JIS Z3265 (which corresponds to AWS A5.8-69) is used for the brazing of titanium or titanium alloy, copper or nickel contained in these materials reacts with titanium by the high temperature created during the brazing and produces a fragile compound. Therefore, when extraneous forces are exerted on the brazed portion, peel-off of the brazed surface is liable to occur from that compound lying between the part made of titanium and the brazing filler metal material. Although brazing filler metal materials for titanium are commercially available, the commercially available materials are liable to cause peel-off of the brazed surface by the extraneous forces. Accordingly, silver brazing filler metal, nickel brazing filler metal and commercially available brazing filler metal materials for titanium are not suitable as the brazing filler material for the titanium-made parts of spectacle frames.

When pure silver is used as a brazing filler metal material, no fragile compound is produced and therefore, the strength of the brazed portion is sufficient. However, the brazed surface of the titanium-made parts is activated and, when an electrolyte such as sweat or sea water adheres to the spectacle frame, the titanium tends to ionize. A kind of local battery is produced between the titanium and the silver and therefore, the exposed titanium-made parts begin to corrode from the surface brazed to silver and soon, peel-off of the brazed surface occurs therefrom. Accordingly, the brazing by silver does not directly stand use.

Also, silver has a high melting temperature and therefore, thin members like the parts of a spectacle frame have an undesirable possibility of deformation during the brazing. Correcting such deformation, if it occurs, requires much time, and thus the brazing by pure silver may decrease productivity in the manufacture of spectacle frames.

For the reasons set forth above, the well-known silver brazing filler metal, nickel brazing filler metal, commercially available brazing filler metal materials for titanium, and pure silver are not suitable for the brazing of spectacle frame parts made of titanium or titanium alloy.

SUMMARY OF THE INVENTION

It is therefore an object of the present invention to improve the brazing filler metal material used in a spectacle frame made of titanium or titanium alloy and having at at least one location a brazed portion of titanium or titanium alloy formed with titanium or titanium alloy or of titanium or titanium alloy formed with another metal. It is another object of the present invention to provide a spectacle frame including brazed titanium or titanium alloy and having a sufficient strength even when extraneous forces such as bending or torsion are exerted thereon, or an electrolyte such as sweat or sea water adheres thereto, and capable of high productivity in manufacture that is attributable to the low melting temperature of the brazing filler metal material.

The inventors, as a result of their ardent study, have found that the silver-zinc alloy hereinafter described is best suited as the solder material used for the manufacture of spectacle frames made of titanium or titanium alloy. Accordingly, the present invention provides a spectacle frame made of titanium or titanium alloy and having at at least one location a brazed portion of titanium or titanium alloy formed with titanium or titanium alloy, or of titanium or titanium alloy found with another metal, characterized in that use is made of silver-zinc alloy comprising 95–70% by weight of silver and 5–30% by weight of zinc.

The invention will become fully apparent from the following detailed description thereof taken in conjunction with the accompanying drawings.

DESCRIPTION OF THE PREFERRED EMBODIMENT

Figure 1:
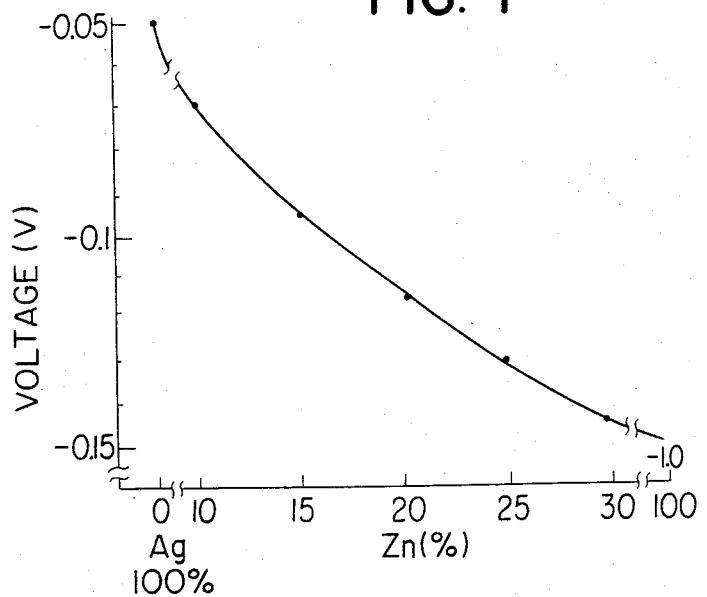
FIG. 1 is a graph showing the potential difference between a calomel electrode and Ag-Zn alloy.

FIG. 1 shows the result of the measurement of the potential of an alloy of pure silver and zinc with respect to a calomel electrode in 3% common salt water. As will be seen from this figure, the potential difference becomes greater as the zinc content ratio increases. 100% zinc has a potential difference of $-1.0[V]$, which is approximate to the potential difference of activated titanium. Accordingly, by adding zinc to pure silver, it is possible to suppress the formation of a local battery on the brazed surface between a part made of titanium and a brazing filler metal material and obtain a brazing filler metal material in which corrosion by an electrolyte is suppressed. Also, this silver-zinc alloy has a good adhesion property with respect to titanium and does not react with titanium to form a fragile substance.

The inventors carried out the following tests to compare the performances of various brazing filler metal materials.

(1) Preparation of a test bar

First, the end faces of φ2 mm wires of two commercially available annealed pure titanium materials were abutted against each other and the abutted portions were brazed to each other by the use of each brazing filler metal material listed in Table 1 below. The brazing was carried out by high frequency induction heating in an argon gas atmosphere. After the brazing, the brazed portion was ground so as to have an outside diameter equal to that of the pure titanium wire, whereby a test bar was obtained. Two test bars were prepared for the same brazing filler metal material and one of them was used intact for a bending test, and the other was used for a corrosion test, and then subjected to a bend test.

(2) Bend Test

According to the metal material bend test method of JIS Z2204 (corresponding to ASTM E16-64), a bend test was carried out by the use of a push fitting with the distance between supports being 50 mm, and the indentation depth until peel-off of the brazed surface occurred was measured.

The greater the measurement value, the greater the brazing strength.

(3) Corrosion Test

This test was carried out for sixteen hours on the basis of the CASS test (Copper Accetic Acid Salt Spray Testing) (which corresponds to ASTM B368-68) prescribed in JIS H8617.

TABLE 1

| Brazing filler metal material | | Bend depth (mm) | |
|---|---|---|---|
| | | As Brazed | After CASS test |
| Ag | | >20 | 0 |
| Silver brazing filler metal BAg3 *1 | | 8 | 0 |
| Silver brazing filler metal BPd1 *2 | | 8 | 5 |
| Commercially available brazing filler metal material for titanium *3 | | 15 | 10 |
| Commercially available brazing filler metal material for titanium *4 | | 15 | 10 |
| Silver-zinc alloy | Containing Zn 5% wt. | >20 | 10 |
| " | Containing Zn 10% wt. | >20 | >20 |
| " | Containing Zn 20% wt. | >20 | >20 |
| " | Containing Zn 25% wt. | >20 | >20 |
| " | Containing Zn 30% wt. | >20 | >20 |

*1 Ag 51%—Cu 15%—Zn 15%—Cd 16%—Ni 3% by weight
*2 Ag 68%—Cu 27%—Pd 5% by weight
*3 Ag 82%—Pd 9%—Ga 9% by weight
*4 Cu 15%—Ni 15%—Ti 70% by weight As seen from Table 1, the brazing using pure silver showed a great bend strength in its condition as brazed, but the brazing subjected to the CASS test suffered peel-off in the brazed surface before a bend test could be carried out. As soon as a force was imparted by the push fitting, the brazed portion peeled off. Some other solder materials, such as silver solder and commercially available solders for titanium, are strong in their condition as brazed, but when subjected to the CASS test, they deteriorated in strength, and their strength is thus insufficient for a spectacle frame. Materials containing silver and 10% or more by weight of zinc are not at all reduced in bend strength even after being subjected to the CASS test and are suitable as the solder material for spectacle frames.

Figure 2:
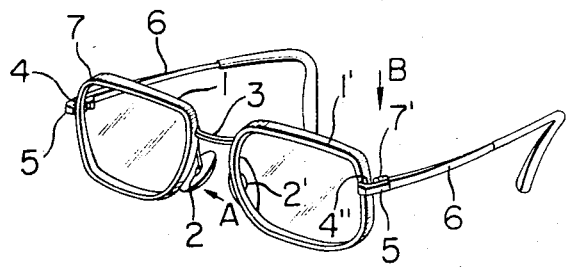
FIG. 2 is a perspective view showing a spectacle frame according to an embodiment of the present invention.
Figure 3:
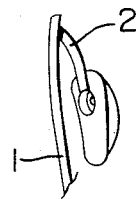
FIG. 3 is a fragmentary view taken along the arrow A of FIG. 2.
Figure 4:
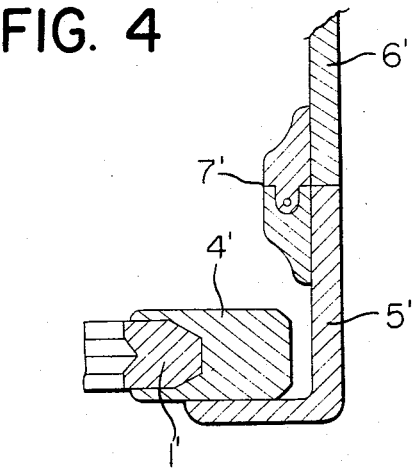
FIG. 4 is a substantially enlarged cross-sectional view taken along the arrow B of FIG. 2.

Typical spectacle frames of titanium or titanium alloy and a test for examining the practical durability of such spectacle frames will now be described. As shown in FIGS. 2-4, a spectacle frame can be made by brazing pad arms 2, 2', bridge 3 and block joints 4, 4' (see FIG. 4) to rims 1, 1', and joints 10, 10' to end pieces 5, 5' and temples 6, 6' in an argon gas atmosphere by electrical resistance heating. Three types of such spectacle frames were made by using silver-zinc alloy (Ag-20Zn), silver brazing filler metal (BAg3) and a commercially available brazing filler metal material for titanium (*3). These spectacle frames were subjected to the CASS test in the same manner as that previously described, and then they were subjected to a durability test. The durability test carried out was of two types, namely, (1) the type in which bending is repeatedly effected at 120° about the brazed portion between the pad arms 2, 2' and the rims 1, 1', and (2) the type in which, in a condition wherein the temples 6—6' at a location 100 mm away from the pad arms 7, 7' toward the ear-engaging portions are fully separated, outwardly directed forces are imparted to the temples 6 and 6' to thereby increase the spacing between the temples 6—6' by 80 mm. As a result, (1) in the pad arm bend test, the brazed portion of Ag-20Zn showed no abnormality even after bending five times while the brazed portion of BAg3 suffered peel-off when bent once and the brazed portion of the commercially available brazing filler metal material for titanium (*3) suffered peel-off when bent twice. This shows that the brazing by BAg3 and the commercially available brazing filler metal material for titanium (*3) cannot keep the strength required of a spectacle frame, due to the effect of corrosion by sweat or the like, but the brazing by Ag-20Zn can keep sufficient strength to provide the endurance required for a spectacle frame.

Also, (2) in the temple opening test, the spectacle frame brazed by Ag-20Zn showed no abnormality even after the temples were repeatedly opened 5000 times.

The melting temperature of silver is 960.5° C., but it is reduced to about 840° C. if silver contains 10% of zinc, to about 755° C. if silver contains 20% of zinc, and to about 710° C. if silver contains 30% of zinc. Accordingly, when silver-zinc alloy is used as a brazing filler metal material, the parts of a spectacle frame are not deformed by heat during brazing and the working property of the brazing becomes better, thus enhancing productivity. Also, the melting temperature of nickel silver used for the joints or the like is as low as about 1100° C. and therefore, it is advantageous that the temperature at which nickel silver is brazed to titanium can be held to a low value by using silver-zinc alloy as the brazing filler metal material. Also, silver-zinc alloy is lower in thermal conductivity than silver and therefore, when "brazing" in which a brazing filler metal material is worked into an elongated wire, namely, so-called "facefed brazing", is carried out, heat does not escape from the heated portion to impede melting of the brazing filler metal material.

If the proportion of zinc contained in silver is made less than 5%, the potential difference with respect to activated titanium will be reduced, thereby reducing the improvement of the corrosion resistance. If the proportion of zinc exceeds 30%, the plastic workability will be impaired and the workability into thin wire (for example, $\phi$0.2 mm) or thin sheet required as the brazing filler metal material for a spectacle frame will be reduced. Accordingly, silver-zinc alloy having a zinc content of 5%–30% is preferable as the brazing filler metal material for brazing the parts of a spectacle frame which are made of titanium or titanium alloy.

The silver-zinc alloy used in the present invention may safely contain a small amount of other metal (such as copper, nickel, titanium or the like) and impurities which will not give a deleterious influence to the property of the brazing filler metal material. An alloy containing 0.5–5% by weight of copper is preferable because the strength of the brazing filler metal material itself is improved.

Accordingly, silver-zinc alloy having the following composition is preferable:

| Silver | 70–95% by weight |
|---|---|
| Zinc | 5–30% by weight (especially 10–30% by weight) |
| Copper | 0.5–5% by weight |

According to the present invention, as has been described above, where parts made of titanium or titanium alloy, for example, Ti-6Al-4V or Ti-3Al-2.5V are to be brazed to each other or where such parts are to be brazed to parts made of other metal, for example, nickel silver, stainless steel or brass, the brazing is effected with silver-zinc alloy as the brazing filler metal material and thus, there is obtained a spectacle frame of titanium which is excellent in corrosion resistance and can be manufactured with good productivity.

We claim:

1. A spectacle frame of titanium or titanium alloy having at at least one location a brazed portion of titanium or titanium alloy joined with titanium or titanium alloy, or of titanium or titanium alloy joined with another metal, characterized in that silver-zinc alloy consisting essentially of 70–95% by weight of silver and 5–30% by weight of zinc is used as a brazing filler metal material of the brazed portion.

2. A spectacle frame according to claim 1, characterized in that said silver-zinc alloy consists essentially of 70–90% by weight of silver and 10–30% by weight of zinc.

3. A spectacle frame of titanium or titanium alloy having at at least one location a brazed portion of titanium or titanium alloy joined with titanium or titanium alloy, or of titanium or titanium alloy joined with another metal, characterized in that silver-zinc alloy consisting essentially of 70–95% by weight of silver, 5–30% by weight of zinc and 0.5–5% by weight of copper is used as a brazing filler metal material of the brazed portion.

* * * * *